US012527800B2

United States Patent
Kanda et al.

(10) Patent No.: US 12,527,800 B2
(45) Date of Patent: Jan. 20, 2026

(54) THERAPEUTIC AGENT FOR PARKINSON'S DISEASE

(71) Applicant: KYOWA KIRIN CO., LTD., Tokyo (JP)

(72) Inventors: Tomoyuki Kanda, Tokyo (JP); Akihisa Mori, Tokyo (JP); Hiroki Kitabayashi, Tokyo (JP); Takanobu Nomura, Tokyo (JP); Nobutaka Hattori, Tokyo (JP)

(73) Assignee: KYOWA KIRIN CO., LTD., Tokyo (JP)

(*) Notice: Subject to any disclaimer, the term of this patent is extended or adjusted under 35 U.S.C. 154(b) by 1052 days.

(21) Appl. No.: 17/441,234

(22) PCT Filed: Mar. 19, 2020

(86) PCT No.: PCT/JP2020/012509
§ 371 (c)(1),
(2) Date: Sep. 20, 2021

(87) PCT Pub. No.: WO2020/189781
PCT Pub. Date: Sep. 24, 2020

(65) Prior Publication Data
US 2022/0168311 A1 Jun. 2, 2022

Related U.S. Application Data

(60) Provisional application No. 62/821,961, filed on Mar. 21, 2019.

(51) Int. Cl.
*A61K 31/522* (2006.01)
*A61K 31/13* (2006.01)
*A61K 31/137* (2006.01)
*A61K 31/198* (2006.01)
*A61K 31/277* (2006.01)
*A61K 31/423* (2006.01)
*A61K 45/06* (2006.01)
*A61P 25/16* (2006.01)
*A61P 25/26* (2006.01)

(52) U.S. Cl.
CPC .......... *A61K 31/522* (2013.01); *A61K 31/198* (2013.01); *A61P 25/16* (2018.01)

(58) Field of Classification Search
None
See application file for complete search history.

(56) References Cited

U.S. PATENT DOCUMENTS

| 5,587,378 A | 12/1996 | Suzuki et al. |
| 7,727,993 B2 | 6/2010 | Kase et al. |

OTHER PUBLICATIONS

Nourianz, 2019, https://web.archive.org/web/20190828160909/https://www.fiercepharma.com/pharma/spurned-by-fda-over-a-decade-ago-kyowa-kirin-nabs-nod-for-parkinson-s-drug.*
Nourianz-2, https://www.nourianzhcp.com/safety/, 2019.*
Nourianz-3, 2013, https://www.kyowakirin.com/media_center/news_releases/2013/e20130529_01.html.*
Extended European Search Report issued in connection with EP Appl. Ser. No. 20774542.3 dated Nov. 28, 2022 (7 pages).
Gottwald M D et al: "New frontiers in the pharmacological management of Parkinson's disease", Drugs of Today / Medicamentos De Actualidad, J.R. Prous SS.A. International Publishiers, ES, vol. 44, No. 7, Jul. 1, 2008, pp. 531-545.
Hattori Nobutaka et al: "A Pooled Analysis From Phase 2b and 3 Studies in Japan of Istradefylline in Parkinson's Disease", Movement Disorders, vol. 35, No. 8, Jun. 5, 2020, pp. 1481-1487.
Takahashi Makio et al: "Safety and effectiveness of istradefylline in patients with Parkinson's disease: interim analysis of a post-marketing surveillance study in Japan", Expert Opin Pharmacother, vol. 19, No. 15, Oct. 3, 2018, pp. 1635-1642.
Post, et al., "Clinical heterogeneity in newly diagnosed Parkinson's disease", J. Neurol. 255:716-722 (2008).
Summary of (Drug) Application Data for Istradefylline, Kyowa Kirin Co., Ltd., Part 2 (Module 2) Summary of the CTD (Summary), 2. Clinical Summary, 2.7.3 Clinical usefulness (Oct. 3, 2020), machine translation.
International Search Report and Written Opinion received in International Application No. PCT/JP2020/012509 on Jun. 2, 2020 (13 pages).
Japanese Journal of Clinical Med, Parkinson's Disease, 2nd ed, May 31, 2018, vol. 76, suppl. No. 4 (cumulative No. 1142), pp. 461-466, 679-681, 703-708, non-official translation (Japanese Journal of Clinical Medicine. Parkinson's Disease (Second Edition) : Updates for Foundational/Clinical Research.).
Japanese Clinical, vol. 75, No. 1 (cumulative No. 1113), Jan. 1, 2017, pp. 71-76, entire text (Japanese Journal of Clinical Medicine.).
Yabe, et al., "The Efficacy of Istradefylline for Treating Mild Wearing-Off in Parkinson Disease", Clinical Neuropharmacology 40(6): 261-263 (2017).

* cited by examiner

*Primary Examiner* — Sun Jae Yoo
(74) *Attorney, Agent, or Firm* — Foley & Lardner LLP

(57) ABSTRACT

A therapeutic agent for Parkinson's disease containing istradefylline as an effective ingredient being characterized in exhibiting more expression of a shortening effect of the OFF time by administration to a patient of Parkinson's disease of 65 or more years old as compared with administration to a patient of Parkinson's disease of younger than 65 years old.

5 Claims, No Drawings

THERAPEUTIC AGENT FOR PARKINSON'S DISEASE

CROSS-REFERENCE TO RELATED APPLICATIONS

The present application claims priority under 37 U.S.C. § 371 to International Patent Application No. PCT/JP2020/012509, filed Mar. 19, 2020, which claims priority to and the benefit of U.S. Patent Provisional Application No. 62/821,961, filed on Mar. 21, 2019. The contents of these applications are hereby incorporated by reference in their entireties.

TECHNICAL FIELD

The present invention relates to the treatment of Parkinson's disease using istradefylline, and the like.

BACKGROUND ART

Parkinson's disease is a brain disease characterized by motor symptoms such as tremor, akinesia/bradykinesia, muscle rigidity, and postural reflex disorder. The symptoms of Parkinson's disease result from a deficiency of dopamine in part of the brain, and most therapeutic agents for Parkinson's disease bring the deficient amount of dopamine closer to its original state or mimic the action of dopamine.

Levodopa (L-dopa; L-3,4-dihydroxyphenylalanine) is a substance that is metabolized by dopa decarboxylase to become dopamine, and was reported in 1967, but even now, more than 50 years after its discovery, it has been most used for the treatment of Parkinson's disease. Levodopa has a strong and rapid therapeutic effect in Parkinson's disease, however, serious and unfavorable reactions caused by dopamine including motor complications such as a wearing-off phenomenon, on-off fluctuations, and dyskinesias occur.

On the other hand, istradefylline [the following Formula (I)] is a non-dopaminergic compound having an $A_{2A}$ receptor antagonistic activity and is known to be useful for the treatment of Parkinson's disease (PTL 1), and is known to be useful for the treatment of Parkinson's disease in combination with levodopa and useful for the treatment of movement disorders such as motor complications (PTL 2).

In addition, Nouriast (registered trademark) containing istradefylline as an active ingredient was approved for manufacture and sale in Japan in 2013 as a therapeutic agent for Parkinson's disease, and is marketed for the indications of "improving a wearing-off phenomenon in Parkinson's disease during the course of treatment with a levodopa-containing preparation". Further, it was also approved and launched in the United States in 2019.

[Chem. 1]

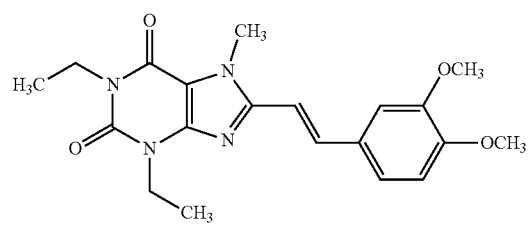

(I)

CITATION LIST

Patent Literature

PTL 1: U.S. Pat. No. 5,587,378
PTL 2: U.S. Pat. No. 7,727,993

SUMMARY OF INVENTION

Technical Problem

No analysis has been conducted yet for the fact that istradefylline achieves more excellent effect in a patient group having what kind of the characteristic and also for the fact that what patient factor more favorably affects the expression of effectiveness whereby no information has been known yet concerning the patient background factor which much more affects the expression of effect of istradefylline. In such a circumstance, it has been demanded from the medical job site to actualize the personalized medical care in the treatment of Parkinson's disease by istradefylline.

Therefore, an object of the present invention is to provide a means for realizing the personalized medical care in the treatment of Parkinson's disease by istradefylline.

Solution to Problem

The present inventors considered that the personalized medical care in the treatment of Parkinson's disease by istradefylline can be realized by finding a specific patient background factor corresponding to the above-mentioned factor among a plurality of patient background factors that can be examined when starting the treatment with istradefylline, and conducted a combined analysis of Ph2b study and Ph3 study of istradefylline in Japan. As a result, from the data of more than 700 patients of Parkinson's disease, specific patient background factors that more favorably affect the expression of effect of istradefylline was found. The present inventors found out that by administering istradefylline to a patient having such an individual background factor, the expression of effect of istradefylline can be further expected in the patient as compared with the other cases, and thus completed the present invention.

The present invention relates to the following (1) to (72).

(1) A therapeutic agent for Parkinson's disease containing istradefylline as an active ingredient,
  wherein the agent more expresses an effect of shortening an OFF time when the agent is administered to a patient of Parkinson's disease of 65 or more years old than administered to a patient of Parkinson's disease of younger than 65 years old.

(2) The agent according to (1), wherein the more expressing the effect of shortening the OFF time is that a rate of a patient where the OFF time is shortened for long time is high.

(3) The agent according to (1) or (2), wherein
  the effect of shortening the OFF time is that the OFF time is shortened for 1 hour or longer as compared with the case where a placebo is administered, and
  the more expressing the effect of shortening the OFF time is that the effect of shortening the OFF time is significantly improved in terms of odds ratio when the agent is administered to a patient of Parkinson's disease of 65 or more years old, as compared to the case where the agent is administered to a patient of Parkinson's disease of younger than 65 years old (4) A therapeutic agent for Parkinson's disease containing istradefylline as an active ingredient,
wherein the agent more expresses an effect of increasing an ON time without troublesome dyskinesia when the agent is administered to a patient of Parkinson's disease of 65 or more years old than administered to a patient of Parkinson's disease of younger than 65 years old.

(5) The agent according to (4), wherein the more expressing the effect of increasing the ON time without troublesome dyskinesia is that a rate of a patient where the ON time without troublesome dyskinesia is extended for long time is high.

(6) The agent according to (4) or (5), wherein
the effect of increasing the ON time without troublesome dyskinesia is that the ON time without troublesome dyskinesia is extended for one hour or more as compared with the case when a placebo is administered, and
the more expressing the effect of increasing the ON time without troublesome dyskinesia is that the effect of increasing the ON time without troublesome dyskinesia is significantly improved in terms of odds ratio when the agent is administered to a patient of Parkinson's disease of 65 or more years old, as compared to the case where the agent is administered to a patient of Parkinson's disease of younger than 65 years old.

(7) A therapeutic agent for Parkinson's disease containing istradefylline as an active ingredient,
wherein the agent more expresses an effect of improving a UPDRS Part III score when the agent is administered to a patient of Parkinson's disease where the UPDRS Part III score is 20 points or more before the treatment with the therapeutic agent for Parkinson's disease, as compared with a patient of Parkinson's disease where the UPDRS Part III score is less than 20 points before the treatment with the therapeutic agent for Parkinson's disease.

(8) The agent according to (7), wherein the more expressing the effect of improving the UPDRS Part III score is that a rate of a patient where the UPDRS Part III score is improved is high.

(9) The agent according to (7) or (8), wherein
the effect of improving the UPDRS Part III score is that the UPDRS Part III score shows an improvement of 3 points or more as compared with the case where a placebo is administered, and
the more expressing the effect of improving the UPDRS Part III score is that the effect of improving the UPDRS Part III score is significantly improved in terms of odds ratio when the agent is administered to a patient of Parkinson's disease where the UPDRS Part III score is 20 points or more before the treatment with the therapeutic agent for Parkinson's disease, as compared to the case where the agent is administered to a patient of Parkinson's disease where the UPDRS Part III score is less than 20 points before the treatment with the therapeutic agent for Parkinson's disease.

(10) A therapeutic agent for Parkinson's disease containing istradefylline as an active ingredient,
wherein the agent more expresses an effect of improving a UPDRS Part II score when the agent is administered to a patient of Parkinson's disease where a m Hoehn & Yahr scale at OFF state is 3 or more before the treatment with the therapeutic agent for Parkinson's disease, as compared with a patient of Parkinson's disease where the m Hoehn & Yahr scale at OFF state is less than 3 before the treatment with the therapeutic agent for Parkinson's disease.

(11) The agent according to (10), wherein the more expressing the effect of improving the UPDRS Part II score is that a rate of a patient where the UPDRS Part II score is improved is high.

(12) The agent according to (10) or (11), wherein
the effect of improving the UPDRS Part II score is that the UPDRS Part II score shows an improvement of 3 points or more as compared with the case where a placebo is administered, and
the more expressing the effect of improving the UPDRS Part II score is that the effect of improving the UPDRS Part II score is significantly improved in terms of odds ratio when the agent is administered to a patient of Parkinson's disease where the m Hoehn & Yahr scale at OFF state is 3 or more before the treatment with the therapeutic agent for Parkinson's disease, as compared to the case where the agent is administered to a patient of Parkinson's disease where the m Hoehn & Yahr scale at OFF state is less than 3 before the treatment with the therapeutic agent for Parkinson's disease.

(13) A therapeutic agent for Parkinson's disease containing istradefylline as an active ingredient,
wherein the agent more improves clinical global impression-improvement (CGI-I) when the agent is administered to a patient of Parkinson's disease where a m Hoehn & Yahr scale at OFF state is 3 or more before the treatment with the therapeutic agent for Parkinson's disease, as compared with a patient of Parkinson's disease where the m Hoehn & Yahr scale at OFF state is less than 3 before the treatment with the therapeutic agent for Parkinson's disease.

(14) The agent according to (13), wherein the more improving the CGI-I is that a rate of a patient showing "very much improved", "much improved" or "minimally improved" in terms of the CGI-I score is high, as compared with the case where a placebo is administered.

(15) The agent according to (13) or (14), wherein
the improvement of the CGI-I is that a patient shows "very much improved", "much improved" or "minimally improved" in terms of the CGI-I score, and
the more improving the CGI-I is that the CGI-I is significantly improved in terms of odds ratio when the agent is administered to a patient of Parkinson's disease where the m Hoehn & Yahr scale at OFF state is 3 or more before the treatment with the therapeutic agent for Parkinson's disease, as compared to the case where the agent is administered to a patient of Parkinson's disease where the m Hoehn & Yahr scale at OFF state before the treatment with the therapeutic agent for Parkinson's disease is less than 3.

(16) The agent according to any of (1) to (15), wherein the daily dose of istradefylline is 20 mg or 40 mg.

(17) The agent according to any of (1) to (15), wherein the daily dose of istradefylline is 40 mg.

(18) The agent according to any of (1) to (17), wherein the agent is administered to a patient of Parkinson's disease during the course of treatment with an agent containing levodopa.

(19) A method for more expressing an effect of shortening an OFF time in treatment of Parkinson's disease as compared with the case where a therapeutic agent for Parkinson's disease containing istradefylline as an active ingredient is administered to a patient of Parkinson's disease of younger than 65 years old, comprising administering the therapeutic agent for Parkinson's disease containing istradefylline as an active ingredient to a patient of Parkinson's disease of 65 or more years old.

(20) The method according to (19), wherein the more expressing the effect of shortening the OFF time is that a rate of a patient where the OFF time is shortened for long time is high.

(21) The method according to (19) or (20), wherein
the effect of shortening the OFF time is that the OFF time is shortened for 1 hour or longer as compared with the case where a placebo is administered, and
the more expressing the effect of shortening the OFF time is that the effect of shortening the OFF time is significantly improved in terms of odds ratio when the agent is administered to a patient of Parkinson's disease of 65 or more years old, as compared to the case where the agent is administered to a patient of Parkinson's disease of younger than 65 years old.

(22) A method for more expressing an effect of increasing an ON time without troublesome dyskinesia in treatment of Parkinson's disease as compared with the case where a therapeutic agent for Parkinson's disease containing istradefylline as an active ingredient is administered to a patient of Parkinson's disease of younger than 65 years old, comprising administering the therapeutic agent for Parkinson's disease containing istradefylline as an active ingredient to a patient of Parkinson's disease of 65 or more years old.

(23) The method according to (22), wherein the more expressing the effect of increasing the ON time without troublesome dyskinesia in the treatment of Parkinson's disease is that a rate of a patient where the ON time without troublesome dyskinesia is extended for long time is high.

(24) The method according to (22) or (23), wherein
the effect of increasing the ON time without troublesome dyskinesia is that the ON time without troublesome dyskinesia is extended for one hour or more as compared with the case when a placebo is administered, and
the more expressing the effect of increasing the ON time without troublesome dyskinesia is that the effect of increasing the ON time without troublesome dyskinesia is significantly improved in terms of odds ratio when the agent is administered to a patient of Parkinson's disease of 65 or more years old, as compared to the case where the agent is administered to a patient of Parkinson's disease of younger than 65 years old.

(25) A method for more expressing an effect of improving the UPDRS Part III score as compared with the case where a therapeutic agent for Parkinson's disease containing istradefylline as an active ingredient is administered to a patient of Parkinson's disease where a UPDRS Part III score is less than 20 points before the treatment with the therapeutic agent for Parkinson's disease, comprising administering the therapeutic agent for Parkinson's disease containing istradefylline as an active ingredient to a patient of Parkinson's disease where a UPDRS Part III score is 20 points or more before the treatment with the therapeutic agent for Parkinson's disease.

(26) The method according to (25), wherein the more expressing the effect of improving the UPDRS Part III score is that a rate of a patient where the UPDRS Part III score is improved is high.

(27) The method according to (25) or (26), wherein
the effect of improving the UPDRS Part III score is that the UPDRS Part III score shows an improvement of 3 points or more as compared with the case where a placebo is administered, and
the more expressing the effect of improving the UPDRS Part III score is that the effect of improving the UPDRS Part III score is significantly improved in terms of odds ratio when the agent is administered to a patient of Parkinson's disease where the UPDRS Part III score is 20 points or more before the treatment with the therapeutic agent for Parkinson's disease, as compared to the case where the agent is administered to a patient of Parkinson's disease where the UPDRS Part III score is less than 20 points before the treatment with the therapeutic agent for Parkinson's disease.

(28) A method for more expressing an effect of improving a UPDRS Part II score as compared with the case where a therapeutic agent for Parkinson's disease containing istradefylline as an active ingredient is administered to a patient of Parkinson's disease where a m Hoehn & Yahr scale at OFF state is less than 3 before the treatment with the therapeutic agent for Parkinson's disease, comprising administering the therapeutic agent for Parkinson's disease containing istradefylline as an active ingredient to a patient of Parkinson's disease where a m Hoehn & Yahr scale at OFF state is 3 or more before the treatment with the therapeutic agent for Parkinson's disease.

(29) The method according to (28), wherein the more expressing the effect of improving the UPDRS Part II score is that a rate of a patient where the UPDRS Part II score is improved is high.

(30) The method according to (28) or (29), wherein
the effect of improving the UPDRS Part II score is that the UPDRS Part II score shows an improvement of 3 points or more as compared with the case where a placebo is administered, and
the more expressing the effect of improving the UPDRS Part II score is that the effect of improving the UPDRS Part II score is significantly improved in terms of odds ratio when the agent is administered to a patient of Parkinson's disease where the m Hoehn & Yahr scale at OFF state is 3 or more before the treatment with the therapeutic agent for Parkinson's disease, as compared to the case where the agent is administered to a patient of Parkinson's disease where the m Hoehn & Yahr scale at OFF state is less than 3 before the treatment with the therapeutic agent for Parkinson's disease.

(31) A method for more improving clinical global impression-improvement (CGI-I) as compared with the case where a therapeutic agent for Parkinson's disease containing istradefylline as an active ingredient is administered to a patient of Parkinson's disease where a m Hoehn & Yahr scale at OFF state is less than 3 before the treatment with the therapeutic agent for Parkinson's disease, comprising administering the therapeutic agent for Parkinson's disease containing istradefylline as an active ingredient to a patient of Parkinson's disease where a m Hoehn & Yahr scale at OFF state is 3 or more before the treatment with the therapeutic agent for Parkinson's disease.

(32) The method according to (31), wherein the more improving the CGI-I is that a rate of a patient showing "very much improved", "much improved" or "minimally improved" in terms of the CGI-I score is high, as compared with the case where a placebo is administered.

(33) The method according to (31) or (32), wherein
the improvement of the CGI-I is that a patient shows "very much improved", "much improved" or "minimally improved" in terms of the CGI-I score, and
the more improving the CGI-I is that the CGI-I is significantly improved in terms of odds ratio when the agent is administered to a patient of Parkinson's disease where the m Hoehn & Yahr scale at OFF state is 3 or more before the treatment with the therapeutic agent for Parkinson's disease, as compared to the case where the agent is administered to a patient of Parkinson's disease where the m Hoehn & Yahr scale at OFF state before the treatment with the therapeutic agent for Parkinson's disease is less than 3.

(34) The method according to any of (19) to (33), wherein the daily dose of istradefylline is 20 mg or 40 mg.

(35) The method according to any of (19) to (33), wherein the daily dose of istradefylline is 40 mg.

(36) The method according to any of (19) to (35), wherein the agent is administered to a patient of Parkinson's disease during the course of treatment with an agent containing levodopa.

(37) Use of istradefylline or a pharmacologically acceptable salt thereof for more expressing an effect of shortening an OFF time in the treatment of Parkinson's disease by administration to a patient of Parkinson's disease of 65 or more years old as compared with the case where it is administered to a patient of Parkinson's disease of younger than 65 years old.

(38) The use according to (37), wherein the more expressing the effect of shortening the OFF time is that a rate of a patient where the OFF time is shortened for long time is high.

(39) The use according to (37) or (38), wherein
the effect of shortening the OFF time is that the OFF time is shortened for 1 hour or longer as compared with the case where a placebo is administered, and
the more expressing the effect of shortening the OFF time is that the effect of shortening the OFF time is significantly improved in terms of odds ratio when it is administered to a patient of Parkinson's disease of 65 or more years old, as compared to the case where it is administered to a patient of Parkinson's disease of younger than 65 years old.

(40) Use of istradefylline or a pharmacologically acceptable salt thereof for more expressing an effect of increasing an ON time without troublesome dyskinesia in the treatment of Parkinson's disease by administration to a patient of Parkinson's disease of 65 or more years old as compared with the case where it is administered to a patient of Parkinson's disease of younger than 65 years old.

(41) The use according to (40), wherein the more expressing the effect of increasing the ON time without troublesome dyskinesia is that a rate of a patient where the ON time without troublesome dyskinesia is extended for long time is high.

(42) The use according to (40) or (41), wherein
the effect of increasing the ON time without troublesome dyskinesia is that the ON time without troublesome dyskinesia is extended for one hour or more as compared with the case when a placebo is administered, and
the more expressing the effect of increasing the ON time without troublesome dyskinesia is that the effect of increasing the ON time without troublesome dyskinesia is significantly improved in terms of odds ratio when it is administered to a patient of Parkinson's disease of 65 or more years old, as compared to the case where it is administered to a patient of Parkinson's disease of younger than 65 years old.

(43) Use of istradefylline or a pharmacologically acceptable salt thereof for more expressing an effect of improving a UPDRS Part III score by administration to a patient of Parkinson's disease where the UPDRS Part III score before treatment is 20 points or more as compared with the case where it is administered to a patient of Parkinson's disease where the UPDRS Part III score before treatment is less than 20 points.

(44) The use according to (43), wherein the more expressing the effect of improving the UPDRS Part III score is that a rate of a patient where the UPDRS Part III score is improved is high.

(45) The use according to (43) or (44), wherein
the effect of improving the UPDRS Part III score is that the UPDRS Part III score shows an improvement of 3 points or more as compared with the case where a placebo is administered, and
the more expressing the effect of improving the UPDRS Part III score is that the effect of improving the UPDRS Part III score is significantly improved in terms of odds ratio when it is administered to a patient of Parkinson's disease where the UPDRS Part III score is 20 points or more before the treatment with the therapeutic agent for Parkinson's disease, as compared to the case where it is administered to a patient of Parkinson's disease where the UPDRS Part III score is less than 20 points before the treatment with the therapeutic agent for Parkinson's disease.

(46) Use of istradefylline or a pharmacologically acceptable salt thereof for more expressing an effect of improving a UPDRS Part II score by administration to a patient of Parkinson's disease where a m Hoehn & Yahr scale at OFF state before treatment is 3 or more as compared with the case where it is administered to a patient of Parkinson's disease where the m Hoehn & Yahr scale at OFF state before treatment is less than 3.

(47) The use according to (46), wherein the more expressing the effect of improving the UPDRS Part II score is that a rate of a patient where the UPDRS Part II score is improved is high.

(48) The use according to (46) or (47), wherein
the effect of improving the UPDRS Part II score is that the UPDRS Part II score shows an improvement of 3 points or more as compared with the case where a placebo is administered, and
the more expressing the effect of improving the UPDRS Part II score is that the effect of improving the UPDRS Part II score is significantly improved in terms of odds ratio when it is administered to a patient of Parkinson's disease where the m Hoehn & Yahr scale score at OFF state is 3 or more before the treatment with the therapeutic agent for Parkinson's disease, as compared to the case where it is administered to a patient of Parkinson's disease where the m Hoehn & Yahr scale at OFF state is less than 3 before the treatment with the therapeutic agent for Parkinson's disease.

(49) Use of istradefylline or a pharmacologically acceptable salt thereof for more improving clinical global impression-improvement (CGI-I) by administration to a patient of Parkinson's disease where a m Hoehn & Yahr scale at OFF state before treatment is 3 or more as compared with the case where it is administered to a patient of Parkinson's disease where the m Hoehn & Yahr scale at OFF state before treatment is less than 3.

(50) The use according to (49), wherein the more improving the CGI-I is that a rate of a patient showing "very much improved", "much improved" or "minimally improved" in terms of the CGI-I score is high, as compared with the case where a placebo is administered.

(51) The use according to (49) or (50), wherein
the improvement of the CGI-I is that a patient shows "very much improved", "much improved" or "minimally improved" in terms of the CGI-I score, and
the more improving the CGI-I is that the CGI-I is significantly improved in terms of odds ratio when it is administered to a patient of Parkinson's disease where the m Hoehn & Yahr scale at OFF state is 3 or more before the treatment with the therapeutic agent for Parkinson's disease, as compared to the case where it is administered to a patient of Parkinson's disease where the m Hoehn & Yahr scale at OFF state before the treatment with the therapeutic agent for Parkinson's disease is less than 3.

(52) The use according to any of (37) to (51), wherein the daily dose of istradefylline is 20 mg or 40 mg.

(53) The use according to any of (37) to (51), wherein the daily dose of istradefylline is 40 mg.

(54) The use according to any of (37) to (53), wherein the administration is performed to a patient of Parkinson's disease during the course of treatment with an agent containing levodopa.

(55) Use of istradefylline or a pharmacologically acceptable salt thereof for manufacture of a therapeutic agent for more expressing an effect of shortening an OFF time in the treatment of Parkinson's disease by administration to a patient of Parkinson's disease of 65 or more years old as compared with the case where it is administered to a patient of Parkinson's disease of younger than 65 years old.

(56) The use according to (55), wherein the more expressing the effect of shortening the OFF time is that a rate of a patient where the OFF time is shortened for long time is high.

(57) The use according to (55) or (56), wherein
the effect of shortening the OFF time is that the OFF time is shortened for 1 hour or longer as compared with the case where a placebo is administered, and
the more expressing the effect of shortening the OFF time is that the effect of shortening the OFF time is significantly improved in terms of odds ratio when it is administered to a patient of Parkinson's disease of 65 or more years old, as compared to the case where it is administered to a patient of Parkinson's disease of younger than 65 years old.

(58) Use of istradefylline or a pharmacologically acceptable salt thereof for manufacture of a therapeutic agent for more expressing an effect of increasing an ON time without troublesome dyskinesia in the treatment of Parkinson's disease by administration to a patient of Parkinson's disease of 65 or more years old as compared with the case where it is administered to a patient of Parkinson's disease of younger than 65 years old.

(59) The use according to (58), wherein the more expressing the effect of increasing the ON time without troublesome dyskinesia is that a rate of a patient where the ON time without troublesome dyskinesia is extended for long time is high.

(60) The use according to (58) or (59), wherein
the effect of increasing the ON time without troublesome dyskinesia is that the ON time without troublesome dyskinesia is extended for one hour or more as compared with the case when a placebo is administered, and
the more expressing the effect of increasing the ON time without troublesome dyskinesia is that the effect of increasing the ON time without troublesome dyskinesia is significantly improved in terms of odds ratio when it is administered to a patient of Parkinson's disease of 65 or more years old, as compared to the case where it is administered to a patient of Parkinson's disease of younger than 65 years old.

(61) Use of istradefylline or a pharmacologically acceptable salt thereof for manufacture of a therapeutic agent for more expressing an effect of improving a UPDRS Part III score by administration to a patient of Parkinson's disease where the UPDRS Part III score before treatment is 20 points or more as compared with the case where it is administered to a patient of Parkinson's disease where the UPDRS Part III score before treatment is less than 20 points.

(62) The use according to (61), wherein the more expressing the effect of improving the UPDRS Part III score is that a rate of a patient where the UPDRS Part III score is improved is high.

(63) The use according to (61) or (62), wherein
the effect of improving the UPDRS Part III score is that the UPDRS Part III score shows an improvement of 3 points or more as compared with the case where a placebo is administered, and
the more expressing the effect of improving the UPDRS Part III score is that the effect of improving the UPDRS Part III score is significantly improved in terms of odds ratio when it is administered to a patient of Parkinson's disease where the UPDRS Part III score is 20 points or more before the treatment with the therapeutic agent for Parkinson's disease, as compared to the case where it is administered to a patient of Parkinson's disease where the UPDRS Part III score is less than 20 points before the treatment with the therapeutic agent for Parkinson's disease.

(64) Use of istradefylline or a pharmacologically acceptable salt thereof for manufacture of a therapeutic agent for more expressing an effect of improving a UPDRS Part II score by administration to a patient of Parkinson's disease where a m Hoehn & Yahr scale at OFF state before treatment is 3 or more as compared with the case where it is administered to a patient of Parkinson's disease where the m Hoehn & Yahr scale at OFF state before treatment is less than 3.

(65) The use according to (64), wherein the more expressing the effect of improving the UPDRS Part II score is that a rate of a patient where the UPDRS Part II score is improved is high.

(66) The use according to (64) or (65), wherein
the effect of improving the UPDRS Part II score is that the UPDRS Part II score shows an improvement of 3 points or more as compared with the case where a placebo is administered, and
the more expressing the effect of improving the UPDRS Part II score is that the effect of improving the UPDRS Part II score is significantly improved in terms of odds ratio when it is administered to a patient of Parkinson's disease where the m Hoehn & Yahr scale at OFF state is 3 or more before the treatment with the therapeutic agent for Parkinson's disease, as compared to the case where it is administered to a patient of Parkinson's disease where the m Hoehn & Yahr scale at OFF state is less than 3 before the treatment with the therapeutic agent for Parkinson's disease.

(67) Use of istradefylline or a pharmacologically acceptable salt thereof for manufacture of a therapeutic agent for more improving clinical global impression-improvement (CGI-I) by administration to a patient of Parkinson's disease where a m Hoehn & Yahr scale at OFF state before treatment is 3 or more as compared with the case where it is administered to a patient of Parkinson's disease where the m Hoehn & Yahr scale at OFF state before treatment is less than 3.

(68) The use according to (67), wherein the more improving the CGI-I is that a rate of a patient showing "very much improved", "much improved" or "minimally improved" in terms of the CGI-I score is high, as compared with the case where a placebo is administered.

(69) The use according to (67) or (68), wherein
the improvement of the CGI-I is that a patient shows "very much improved", "much improved" or "minimally improved" in terms of the CGI-I score, and
the more improving the CGI-I is that the CGI-I is significantly improved in terms of odds ratio when it is administered to a patient of Parkinson's disease where the m Hoehn & Yahr scale at OFF state is 3 or more before the treatment with the therapeutic agent for Parkinson's disease, as compared to the case where it is administered to a patient of Parkinson's disease where the m Hoehn & Yahr scale at OFF state before the treatment with the therapeutic agent for Parkinson's disease is less than 3.

(70) The use according to any of (55) to (69), wherein the daily dose of istradefylline is 20 mg or 40 mg.

(71) The use according to any of (55) to (69), wherein the daily dose of istradefylline is 40 mg.

(72) The use according to any of (55) to (71), wherein the administration is performed to a patient of Parkinson's disease during the course of treatment with an agent containing levodopa.

Advantageous Effects of Invention

According to the present invention, a therapeutic agent for Parkinson's disease containing istradefylline as an active ingredient for a specific patient group having a background factor that allows the treatment of Parkinson's disease using istradefylline to more express an effect, a method for administering a therapeutic agent for Parkinson's disease containing istradefylline as an active ingredient to a specific patient group having a background factor that allows the treatment of Parkinson's disease using istradefylline to more express an effect, and the like can be provided.

DESCRIPTION OF EMBODIMENTS

Parkinson's disease is a chronically progressive neurodegenerative disease and is characterized by four major motor signs: resting tremor, muscle rigidity, akinesia, and postural reflex disorder. With selective degeneration and shedding of dopamine neurons that project from the midbrain substantia nigra to the striatum, dopamine in the striatum is significantly reduced and depleted, which is considered to be the cause of the onset of Parkinson's disease symptoms.

Levodopa is a precursor of a neurotransmitter dopamine, and reaches the central nervous system by peripheral administration. After being taken up by neurons in the brain, it is converted to dopamine by a metabolic enzyme (dopa decarboxylase). Levodopa was developed as a therapeutic agent for Parkinson's disease for the purpose of replenishing the reduction in dopamine in the striatum in Parkinson's disease.

A levodopa-containing preparation is a preparation containing levodopa as an active ingredient, and is a preparation designed for the purpose of inhibiting the peripheral metabolism of levodopa and increasing the utilization rate in the central nervous system. For example, a two-drug combination with carbidopa or benserazide being a peripheral dopa decarboxylase inhibitor, a three-drug combination, in which entacapone being a peripheral catechol O-methyltransferase inhibitor is further added, and the like are available.

UPDRS (Unified Parkinson's Disease Rating Scale) is one of the evaluation indexes of Parkinson's disease. The UPDRS is composed of Part I to IV, and is divided into Part I: non-motor experiences of daily living, Part II: motor experiences of daily living, Part III: motor examination, and Part IV: motor complications.

With respect to "ON" and "OFF" in the treatment of Parkinson's disease, a state in which the effect of a therapeutic agent for Parkinson's disease is observed is defined as "ON", and a state in which the effect is not observed is defined as "OFF". The "OFF" includes phenomena that appear when treatment is performed with a levodopa-containing preparation, such as a wearing-off phenomenon in which the effect of the drug related to motor symptoms does not last, and an on-off phenomenon in which the effect of the drug suddenly diminishes or disappears, or suddenly appears.

The m Hoehn & Yahr scale (modified Hoehn and Yahr Scale) is used as an index indicating the degree of progression (severity) of Parkinson's disease. The m Hoehn & Yahr scale is a scale represented by 8 stages in which stage 0, stage 1.5, and stage 2.5 are added to the original Hoehn & Yahr scale represented by 5 stages from stage 1 to stage 5 (stage 0: no parkinsonism, stage 1: unilateral parkinsonism, stage 1.5: unilateral parkinsonism and truncal ataxia, stage 2: bilateral parkinsonism but no impairment of balance, stage 2.5: mild bilateral parkinsonism and retropulsion but recovers by oneself, stage 3: mild to moderate bilateral parkinsonism and impairment of balance, no assistance required, stage 4: severe parkinsonism and impairment of balance, still able to walk without assistance, and stage 5: wheelchair bound or bedridden unless aided, difficult to walk even with assistance).

The Clinical global impression-improvement (CGI-I) is a 7-point global clinical rating scale (also referred to as a CGI-I score) shown below for evaluating the clinical global improvement. A physician makes a determination by comparison with that at baseline. The 7-point clinical rating scale is composed of: Very much improved, Much improved, Minimally improved, No change, Minimally worse, Much worse, and Very much worse.

EXAMPLES

1. Methods 1.1. Patient Population and Study Design

A pooled analysis was performed for two clinical studies of istradefylline combined with L-DOPA previously conducted in Japan. Both studies were performed according to the principles of the Declaration of Helsinki and were identically designed for 12-week, multicenter, randomized, double-blind, placebo-controlled, and parallel-group studies approved by the relevant institutional review boards of each center [(i) Mizuno Y, Kondo T. Adenosine $A_{2A}$ receptor antagonist istradefylline reduces daily OFF time in Parkinson's disease. *Mov Disord* 2013; 28: 1138-41, and (ii) Mizuno Y, Hasegawa K, Kondo T, et al. Clinical efficacy of istradefylline (KW-6002) in Parkinson's disease: a randomized, controlled study. *Mov Disord* 2010; 25(10): 1437-43)]. Both studies were registered in ClinicalTrials.gov (NCT00455507 [phase 2b] and NCT00955526 [phase 3]). Both studies enrolled patients of Parkinson's disease who were experiencing motor fluctuations.

Key inclusion criteria included age 20 years, stages 2-4 (OFF state) based on the Modified Hoehn and Yahr (mH&Y) scale, stable treatment regimen of antiparkinsonian drugs, and motor fluctuations with an OFF time of 2 hours or longer per day. Key exclusion criteria included history of surgical operation for Parkinson's disease, cognitive impairment, and pregnancy. The study protocols were approved by the institutional review boards at all participating study sites, and written informed consent was obtained from all patients prior to participation.

In both studies, eligible subjects were randomized to one of three groups: 12-week istradefylline 20 mg/day group, 12-week istradefylline 40 mg/day group, and 12-week placebo group. The subjects attended site visits at weeks 2, 4, 8, and 12 after randomization, and submitted patient diaries covering the 7-day period prior to each visit. The full analysis set included subjects who received at least one dose of study drug and completed at least one set of patient diaries.

1.2. Efficacy Outcomes

The primary outcomes were changes in OFF time (hours/day) from baseline to 12 weeks obtained from the patient diaries, which were compared between the placebo group and the istradefylline group. Other outcomes included changes (%) in daily OFF time, changes in ON time without troublesome dyskinesia ("Good" ON time) (Hauser RA, Deckers F, Lehert P. Parkinson's disease home diary: further validation and implications for clinical trials. *Mov Disord* 2004; 19(12): 1409-13), (which was the summation of ON time without dyskinesia and ON time with non-troublesome dyskinesia), UPDRS parts I-IV score, and changes in Clinical Global Impressions-Improvement (CGI-I) score from baseline to 12 weeks. The varying from baseline values, and the treatment effect were determined as a difference in mean change between the placebo group and the istradefylline group during the follow up period.

1.3. Definition of Cut-Off Value for Efficacy Outcomes

The cut-off value for the treatment effect used to determine the efficacy of istradefylline was defined as a reduction in OFF time (1 hour or longer), an increase in ON time without troublesome dyskinesia (1 hour or longer), and an improvement in UPDRS Part III score (3 points or more) from the clinically meaningful point of view. Data distribution of each parameter is comparable, and therefore, the cut off value was defined as a value obtained by subtracting the placebo effect (Hauser RA, Auinger P. Determination of Minimal Clinically Important Change in Early and Advanced Parkinson's Disease. Movement Disorders 2011; 26:813-8). In addition, with respect to the CGI-I score, "very much improved", "much improved", and "minimally improved" were determined to be effective. Further, with respect to the UPDRS Part II score at OFF state, an improvement of 1 point or more from the sensitivity/(1-specificity) curve (ROC curve) using the UPDRS Part II score and the CGI-I score was defined as the cut-off of the effect.

1.4. Statistical Analysis

Baseline data were summarized for all and respective treatment groups (placebo and istradefylline: 20 mg or 40 mg). Continuous variables were expressed as mean and standard deviation (SD), whereas categorical variables were expressed as proportions. The following statistical analyses were performed for patients without any missing data (listwise deletion or complete case analysis).

The study of baseline factors having a favorable effect on the respective outcomes of the efficacy of istradefylline was performed by multivariate logistic regression analysis controlling for 12 baseline factors, which were expressed as the odds ratio (OR) and 95% confidence interval (CI). The efficacy outcomes included daily OFF time, ON time without troublesome dyskinesia, UPDRS Part III score at ON state, CGI-I, and UPDRS Part II score at OFF state. As covariates in the logistic regression analysis, age, sex, the presence or absence of dyskinesia history (determined based on the patient diary at baseline), mean daily OFF time, total UPDRS Part III score, mH&Y score at ON state and OFF state, concomitant drugs, duration of Parkinson's disease (duration of PD), duration of motor complications, L-DOPA dose, and levodopa-equivalent dose were used.

In this study, with respect to the outcomes under the treatment with istradefylline, analysis of baseline factors associated with expressing a more favorable effect was performed according to the following three steps. First, interactions between the treatment with istradefylline (two doses: 20 mg and 40 mg) and 12 baseline factors were evaluated based on type III p-value by multivariate logistic regression analysis (an index for evaluating whether or not the heterogeneity (interaction) occurs in the association between the treatment and the outcome due to a certain baseline factor). As the second step, an odds ratio (OR) was estimated for the baseline factor associated with the achievement of a more favorable effect according to the dose group of istradefylline if a significant interaction is observed between the treatment with istradefylline and the baseline factor. In addition, OR was estimated for the baseline factor associated with the achievement of a more favorable effect in all patient groups if an interaction is not observed between the treatment with istradefylline and the baseline factor.

Further, construction of prognosis prediction models was performed for each of two outcomes (OFF time and ON time without troublesome dyskinesia) as exploratory analysis using the candidate baseline factors obtained by referring to the results of the multivariate logistic regression analysis. The prognosis prediction performance of the models was evaluated by area under the curve (AUC, Mann-Whitney U-statistic) of ROC curves.

A two-tailed p value <0.05 and an interaction p value <0.10 were determined to be statistically significant. All analyses were performed using SAS software version 9.2 or 9.3 (SAS Institute, Inc., Cary, N.C., USA).

2. Results 2.1. Patients

In the phase 2b study, a total of 363 eligible patients were randomized and the full analysis set (FAS) included 357 patients. In the phase 3 study, a total of 373 eligible patients were randomized and the FAS included 366 patients. The total pooled FAS included 723 patients (placebo, n=241; istradefylline 20 mg/day, n=235; and istradefylline 40 mg/day, n=247). The demographic and baseline information for the pooled patient population is summarized in Table 1. Most patient demographic and baseline factors in the treatment groups were comparable within the phase 2b study and the phase 3 study, except for concomitant anti-Parkinson's disease drugs used at baseline because zonisamide was not available during the phase 2b study.

2.2. Effect

The overall efficacy of istradefylline is summarized in Table 2 as the change from baseline associated with each treatment group for each outcome. Distribution of data on OFF time in each treatment group is comparable between groups.

As compared with the placebo group, both dose groups of istradefylline (20 mg/day and 40 mg/day) showed significant reductions in daily OFF time [mean daily OFF time (hours)], daily percentage of OFF time [mean daily OFF time (%)], UPDRS Part III score (ON state) (UPDRS Part III score at ON state), and UPDRS Parts I-III score (ON state) (total UPDRS Parts I-III score at ON state). Further, the istradefylline 40 mg/day group showed significant reductions in UPDRS Part II score (OFF state) and UPDRS Part IV score.

Both dose groups of istradefylline significantly increased ON time without dyskinesia [mean daily ON time (hours) without dyskinesia], ON time with non-troublesome dyskinesia [mean daily ON time (hours) with non-troublesome dyskinesia], ON time without troublesome dyskinesia [mean daily ON time (hours) without troublesome dyskinesia], percentage of ON time without dyskinesia [mean daily percentage of ON time (%) without dyskinesia], percentage of ON time with non-troublesome dyskinesia [mean daily percentage of ON time (%) with non-troublesome dyskinesia], and percentage of ON time without troublesome dyskinesia [mean daily percentage of ON time (%) without troublesome dyskinesia].

2.3. Association Between Efficacy and Patient Baseline Factors by Multivariate Logistic Regression Analysis The patient baseline factors associated with five efficacy outcomes (OFF time reduction, increase in ON time without troublesome dyskinesia, improvement in UPDRS Part II score [OFF state], improvement in UPDRS Part III score, and CGI-I score) and interaction factors (age, mean daily OFF time, total UPDRS Part III score, and mH&Y scale [ON state and OFF state]) under the treatment with istradefylline were studied. The results of the respective outcomes [OFF time, ON time without troublesome dyskinesia, UPDRS Part III score, UPDRS Part II score (OFF state), and CGI-I score] are shown in Table 3 (items 2.3.1 to 2.3.4).

2.3.1. OFF Time Reduction

A reduction in OFF time was observed with istradefylline treatment, and this effect was found to be significantly greater in patients of 65 or more years old as compared with patients of younger than 65 years old (odds ratio: 2.65). Also, patients with a higher mean baseline OFF time showed a significantly greater reduction in OFF time with istradefylline at a dose of 40 mg/day as compared with the case of istradefylline at a dose of 20 mg/day or patients with a lower mean baseline OFF time. The effect of istradefylline at 40 mg/day on OFF time reduction was most favorably observed in patients with an OFF time of 8 hours or longer at baseline (odds ratio: 6.68).

2.3.2. Increase in ON Time without Troublesome Dyskinesia

In patients of 65 or more years old at baseline, a favorable improvement by istradefylline was observed, and the ON time without troublesome dyskinesia increased as compared with patients of younger than 65 years old, and in particular, a significant association was observed in the group treated with istradefylline at 40 mg/day (odds ratio: 2.88).

2.3.3. Improvement in UPDRS Part III Score

The total UPDRS Part III score at baseline was associated with a favorable improvement in UPDRS Part III score by istradefylline treatment. The effect of istradefylline on the improvement in UPDRS Part III score was greater in patients with a total UPDRS Part III score at baseline of 20 points or more as compared with patients with a total UPDRS Part III score at baseline less than 20 points (odds ratio: 2.79). A dose-related effect of istradefylline (20 mg/day or 40 mg/day) was observed for L-DOPA dose, LED, the presence or absence of dyskinesia, and mH&Y stage (OFF state), but the effect was not significant.

2.3.4. Improvement in UPDRS Part II Score (OFF State) and CGI-I Score

Istradefylline at 40 mg/day had a greater effect in patients with a mH&Y scale (OFF state) at baseline of 3 points or more as compared with patients with less than 3 points (odds ratio: 3.50). In addition, the mH&Y scale (OFF state) was found to be associated with a favorable improvement in CGI-I by istradefylline treatment; this effect was more significant in patients with a mH&Y scale (OFF state) of 3 points or more (odds ratio: 1.89). The baseline factors associated with a favorable improvement in CGI-I tended to be similar to those related to UPDRS Part II (OFF state). Since motor symptoms at the patient's office visit is thought to affect the physician's impression, the improvement in CGI-I is considered to be associated with the improvement in UPDRS Part III score. However, in this study, the UPDRS Part II (OFF state) score was also found to be associated with the improvement in CGI-I.

TABLE 1

Demographic and baseline characteristics

| Characteristic | Placebo group N = 241 | Istradefylline group | | Total N = 482 |
| --- | --- | --- | --- | --- |
| | | 20 mg/day N = 235 | 40 mg/day N = 247 | |
| Age, (y) | 65.4 ± 8.1 | 65.6 ± 8.0 | 64.7 ± 8.8 | 65.1 ± 8.4 |
| Sex | | | | |
| Male (%) | 103 (42.7) | 90 (38.3) | 119 (48.2) | 209 (43.4) |
| Female (%) | 138 (57.3) | 145 (61.7) | 128 (51.8) | 273 (56.6) |
| Concomitant anti-PD drug, (number of patients, % in parentheses) | | | | |
| DA | 217 (90.0) | 213 (90.6) | 217 (87.9) | 430 (89.2) |
| Anticholinergic drug | 43 (17.8) | 30 (12.8) | 42 (17.0) | 72 (14.9) |
| SEL | 119 (49.4) | 109 (46.4) | 142 (57.5) | 251 (52.1) |
| ENT | 67 (27.8) | 85 (36.2) | 84 (34.0) | 169 (35.1) |
| AMA | 94 (39.0) | 84 (35.7) | 83 (33.6) | 167 (34.6) |
| ZNS | 17 (7.1) | 13 (5.5) | 20 (8.1) | 33 (6.8) |
| Combinations of concomitant anti-PD drugs, (number of patients, % in parentheses) | | | | |
| L-DOPA, L-DOPA + DA | 51 (26.0) | 44 (23.2) | 50 (24.6) | 94 (23.9) |
| L-DOPA + DA + SEL/ENT/ZNS | 87 (44.4) | 97 (51.1) | 98 (48.3) | 195 (49.6) |
| L-DOPA + DA + SEL/ENT/ZNS + AMA | 58 (29.6) | 49 (25.8) | 55 (27.1) | 104 (26.5) |
| Duration of PD, (y) | 8.161 ± 4.633 | 7.661 ± 4.150 | 7.911 ± 4.299 | 7.789 ± 4.225 |
| Duration of motor complications, (y) | 3.468 ± 3.249 | 3.175 ± 2.629 | 3.192 ± 2.942 | 3.184 ± 2.791 |
| L-DOPA dose, (mg) | 425.8 ± 144.5 | 419.1 ± 137.3 | 417.9 ± 145.9 | 418.5 ± 141.6 |

TABLE 1-continued

Demographic and baseline characteristics

| | | Istradefylline group | | |
|---|---|---|---|---|
| Characteristic | Placebo group N = 241 | 20 mg/day N = 235 | 40 mg/day N = 247 | Total N = 482 |
| L-DOPA-equivalent dose, (mg) | 772.6 ± 278.3 | 740.8 ± 250.5 | 731.3 ± 268.6 | 735.9 ± 259.7 |
| Mean daily OFF time, (h) | 6.37 ± 2.59 | 6.67 ± 2.79 | 6.26 ± 2.48 | 6.46 ± 2.64 |
| Mean daily percentage of OFF time, (%) | 39.20 ± 15.44 | 40.82 ± 16.13 | 38.36 ± 15.18 | 39.56 ± 15.68 |
| Mean daily ON time, (h) | | | | |
| Without dyskinesia | 8.07 ± 3.20 | 7.86 ± 3.42 | 8.26 ± 3.53 | 8.07 ± 3.48 |
| With dyskinesia | 1.77 ± 2.89 | 1.71 ± 2.97 | 1.89 ± 3.26 | 1.80 ± 3.12 |
| With non-troublesome dyskinesia | 1.22 ± 2.20 | 1.13 ± 2.02 | 1.23 ± 2.28 | 1.18 ± 2.15 |
| With troublesome dyskinesia | 0.54 ± 1.30 | 0.58 ± 1.48 | 0.66 ± 1.52 | 0.620 ± 1.50 |
| Without troublesome dyskinesia | 9.28 ± 2.63 | 9.00 ± 2.80 | 9.49 ± 2.81 | 9.25 ± 2.81 |
| Mean daily percentage of ON time, (%) | | | | |
| Without dyskinesia | 49.82 ± 19.29 | 48.61 ± 21.17 | 50.32 ± 20.88 | 49.49 ± 21.02 |
| With dyskinesia | 10.99 ± 17.93 | 10.58 ± 18.35 | 11.33 ± 19.28 | 10.97 ± 18.82 |
| With non-troublesome dyskinesia | 7.62 ± 13.72 | 6.92 ± 12.22 | 7.41 ± 13.49 | 7.17 ± 12.88 |
| With troublesome dyskinesia | 3.37 ± 8.06 | 3.66 ± 9.62 | 3.93 ± 9.01 | 3.80 ± 9.30 |
| Without troublesome dyskinesia | 57.45 ± 15.72 | 55.53 ± 17.09 | 57.72 ± 15.86 | 56.66 ± 16.49 |
| UPDRS Part I score | 1.0 ± 1.4 | 1.1 ± 1.3 | 1.1 ± 1.4 | 1.1 ± 1.3 |
| UPDRS Part II score | | | | |
| ON state | 6.1 ± 5.2 | 5.5 ± 4.9 | 5.7 ± 5.0 | 5.6 ± 4.9 |
| OFF state | 15.2 ± 7.4 | 15.3 ± 7.3 | 15.6 ± 7.7 | 15.5 ± 7.5 |
| UPDRS Part III score at ON state | 21.1 ± 10.5 | 21.2 ± 10.7 | 20.9 ± 11.0 | 21.0 ± 10.8 |
| UPDRS Part IV score | 4.9 ± 2.1 | 5.0 ± 2.0 | 5.1 ± 2.4 | 5.1 ± 2.2 |
| Total UPDRS Parts I-III score at ON state | 28.3 ± 14.5 | 27.8 ± 14.1 | 27.7 ± 14.7 | 27.7 ± 14.4 |
| m Hoehn & Yahr scale at ON state, (number of patients, % in parentheses) | | | | |
| 0 | 1 (0.4) | 2 (0.9) | 2 (0.8) | 4 (0.8) |
| 1 | 15 (6.3) | 9 (3.9) | 11 (4.5) | 20 (4.2) |
| 1.5 | 6 (2.5) | 6 (2.6) | 12 (4.9) | 18 (3.8) |
| 2 | 87 (36.6) | 85 (36.5) | 90 (36.6) | 175 (36.5) |
| 2.5 | 61 (25.6) | 60 (25.8) | 63 (25.6) | 123 (25.7) |
| 3 | 60 (25.2) | 61 (26.2) | 61 (24.8) | 122 (25.5) |
| 4 | 8 (3.4) | 10 (4.3) | 7 (2.8) | 17 (3.5) |
| 5 | 0 (0.0) | 0 (0.0) | 0 (0.0) | 0 (0.0) |
| m Hoehn & Yahr scale at OFF state, (number of patients, % in parentheses) | | | | |
| 0 | 0 (0.0) | 0 (0.0) | 0 (0.0) | 0 (0.0) |
| 1 | 0 (0.0) | 0 (0.0) | 0 (0.0) | 0 (0.0) |
| 1.5 | 0 (0.0) | 0 (0.0) | 0 (0.0) | 0 (0.0) |
| 2 | 13 (5.5) | 14 (6.0) | 17 (6.9) | 31 (6.5) |
| 2.5 | 31 (13.0) | 27 (11.6) | 30 (12.2) | 57 (11.9) |
| 3 | 113 (47.5) | 100 (42.9) | 101 (41.1) | 201 (42.0) |
| 4 | 81 (34.0) | 92 (39.5) | 98 (39.8) | 190 (39.7) |
| 5 | 0 (0.0) | 0 (0.0) | 0 (0.0) | 0 (0.0) |

Data presented as mean ± standard deviation or number of patients (%).
DA = dopamine agonist;
SEL = selegiline;
ENT = entacapone;
AMA = amantadine;
ZNS = zonisamide;
L-DOPA = levodopa;
PD = Parkinson's disease;
UPDRS = Unified Parkinson's Disease Rating Scale

TABLE 2

Change from baseline to week 12 for each endpoint and CGI-I at week 12

| | | Istradefylline group | |
|---|---|---|---|
| Characteristic | Placebo group N = 241 | 20 mg/day N = 235 | 40 mg/day N = 247 |
| Mean daily OFF time, (h) | −0.45 ± 2.25 | −1.23 ± 1.97 (p < 0.0001) | −1.27 ± 2.42 (p < 0.0001) |
| Mean daily percentage of OFF time, (%) | −2.75 ± 13.88 | −7.62 ± 12.62 (p < 0.0001) | −7.76 ± 15.02 (p < 0.0001) |

TABLE 2-continued

Change from baseline to week 12 for each endpoint and CGI-I at week 12

| Characteristic | Placebo group N = 241 | Istradefylline group | |
|---|---|---|---|
| | | 20 mg/day N = 235 | 40 mg/day N = 247 |
| Mean daily ON time, (h) | | | |
| Without dyskinesia | 0.41 ± 2.58 | 1.03 ± 2.20 (p = 0.0020) | 0.99 ± 2.86 (p = 0.0053) |
| With dyskinesia | −0.05 ± 1.70 | 0.19 ± 1.53 (p = 0.9926) | 0.20 ± 1.93 (p = 0.9990) |
| With non-troublesome dyskinesia | 0.03 ± 1.45 | 0.16 ± 1.56 (p = 0.0287) | 0.15 ± 1.36 (p = 0.0496) |
| With troublesome dyskinesia | −0.07 ± 0.84 | 0.03 ± 1.33 (p = 0.9231) | 0.06 ± 1.13 (p = 0.9868) |
| Without troublesome dyskinesia | 0.45 ± 2.46 | 1.19 ± 2.44 (p = 0.0002) | 1.13 ± 2.65 (p = 0.0007) |
| Mean daily percentage of ON time, (%) | | | |
| Without dyskinesia | 2.90 ± 15.85 | 6.28 ± 13.68 (p = 0.0050) | 6.46 ± 17.10 (p = 0.0085) |
| With dyskinesia | −0.16 ± 10.48 | 1.32 ± 9.36 (p = 0.9817) | 1.28 ± 11.40 (p = 0.9939) |
| With non-troublesome dyskinesia | 0.23 ± 8.91 | 1.17 ± 9.54 (p = 0.0442) | 0.92 ± 8.26 (p = 0.0910) |
| With troublesome dyskinesia | −0.39 ± 5.29 | 0.15 ± 8.12 (p = 0.8890) | 0.36 ± 6.44 (p = 0.9832) |
| Without troublesome dyskinesia | 3.13 ± 14.97 | 7.45 ± 14.95 (p = 0.0005) | 7.39 ± 15.73 (p = 0.0013) |
| UPDRS Part I score | −0.1 ± 0.7 | −0.2 ± 0.9 (p = 0.2729) | −0.1 ± 1.0 (p = 0.4129) |
| UPDRS Part II score | | | |
| ON state | −0.6 ± 1.7 | −0.5 ± 2.3 (p = 0.5691) | −0.7 ± 2.2 (p = 0.3266) |
| OFF state | −1.3 ± 3.2 | −1.8 ± 4.1 (p = 0.0698) | −2.0 ± 3.8 (p = 0.0259) |
| UPDRS Part III score at ON state | −3.5 ± 5.3 | −5.1 ± 7.2 (p = 0.0168) | −5.5 ± 6.6 (p = 0.0010) |
| UPDRS Part IV score | −0.2 ± 1.3 | −0.1 ± 1.6 (p = 0.4071) | −0.5 ± 1.6 (p = 0.0110) |
| Total UPDRS Parts I-III at ON state | −4.3 ± 6.2 | −5.8 ± 8.6 (p = 0.0494) | −6.3 ± 8.1 (p = 0.0072) |
| CGI-I, (number of patients, % in parentheses) | | | |
| Very much improved | 3 (1.3) | 6 (2.6) | 11 (4.5) |
| Much improved | 27 (11.3) | 43 (18.3) | 53 (21.5) |
| Minimally improved | 70 (29.2) | 85 (36.2) | 80 (32.5) |
| No change | 121 (50.4) | 85 (36.2) | 84 (34.1) |
| Minimally worse | 19 (7.9) | 12 (5.1) | 16 (6.5) |
| Much worse | 0 (0.0) | 3 (1.3) | 2 (0.8) |
| Very much worse | 0 (0.0) | 1 (0.4) | 0 (0.0) |

Data presented as mean ± standard deviation or number of patients (%).
UPDRS = Unified Parkinson's Disease Rating Scale;
CGI-I = Clinical Global Impressions-Improvement of illness

TABLE 3

Correlation between efficacy and patient demographic factors by multivariate logistic regression analysis

| Characteristic | OFF time | | p for hetero-geneity | ON time without troublesome dyskinesia | | p for hetero-geneity | UPDRS Part II score (OFF) | | p for hetero-geneity |
|---|---|---|---|---|---|---|---|---|---|
| | 20 mg/day | 40 mg/day | | 20 mg/day | 40 mg/day | | 20 mg/day | 40 mg/day | |
| Age, (y) | | | | | | | | | |
| <65 | 1.00 (ref) | | n.s. | 1.00 (ref) | 1.00 (ref) | <0.10 | 1.00 (ref) | | n.s. |
| ≥65 | 2.65 [1.65-4.28] | | | 1.47 [0.76-2.85] | 2.88 [1.41-5.89] | | 0.90 [0.56-1.46] | | |

TABLE 3-continued

Correlation between efficacy and patient demographic factors by multivariate logistic regression analysis

| Mean daily OFF time, (h) | | | | | | | | | |
|---|---|---|---|---|---|---|---|---|---|
| <4 | 1.00 (ref) | 1.00 (ref) | <0.10 | 1.00 (ref) | 1.00 (ref) | <0.10 | 1.00 (ref) | | n.s. |
| 4 to <8 | 1.27 [0.53-3.05] | 1.58 [0.66-3.77] | | 1.09 [0.47-2.56] | 0.58 [0.25-1.34] | | 1.00 [0.55-1.83] | | |
| ≥8 | 1.57 [0.63-3.92] | 6.68 [2.41-18.5] | | 1.19 [0.49-2.91] | 2.38 [0.91-6.21] | | 0.98 [0.51-1.89] | | |
| UPDRS Part III score | | | | | | | | | |
| <20 | 1.00 (ref) | | n.s. | 1.00 (ref) | | n.s. | 1.00 (ref) | | n.s. |
| ≥20 | 0.88 [0.56-1.36] | | | 0.97 [0.63-1.50] | | | 0.79 [0.50-1.25] | | |
| m Hoehn & Yahr scale at OFF state | | | | | | | | | |
| <3 | 1.00 (ref) | | n.s. | 1.00 (ref) | | n.s. | 1.00 (ref) | 1.00 (ref) | <0.10 |
| ≥3 | 0.63 [0.35-1.15] | | | 0.60 [0.33-1.08] | | | 0.99 [0.41-2.39] | 3.50 [1.36-9.00] | |

| | UPDRS Part III score | | | CGI-I | | |
|---|---|---|---|---|---|---|
| Characteristic | 20 mg/day | 40 mg/day | p for heterogeneity | 20 mg/day | 40 mg/day | p for heterogeneity |
| Age, (y) | | | | | | |
| <65 | 1.00 (ref) | | n.s. | 1.00 (ref) | | n.s. |
| ≥65 | 0.65 [0.40-1.06] | | | 1.17 [0.74-1.85] | | |
| Mean daily OFF time, (h) | | | | | | |
| <4 | 1.00 (ref) | | n.s. | 1.00 (ref) | | n.s. |
| 4 to <8 | 0.85 [0.47-1.55] | | | 1.09 [0.61-1.94] | | |
| ≥8 | 0.53 [0.27-1.03] | | | 0.85 [0.45-1.60] | | |
| UPDRS Part III score | | | | | | |
| <20 | 1.00 (ref) | | n.s. | 1.00 (ref) | | n.s. |
| ≥20 | 2.79 [1.75-4.46] | | | 1.49 [0.97-2.30] | | |
| m Hoehn & Yahr scale at OFF state | | | | | | |
| <3 | 1.00 (ref) | | n.s. | 1.00 (ref) | | n.s. |
| ≥3 | 1.81 [0.95-3.46] | | | 1.89 [1.07-3.36] | | |

Data are presented as odds ratio and 95% confident intervals, which were obtained by multivariate logistic regression analyses controlling for baseline factors (age, mean daily OFF time, UPDRS Part III score, m Hoehn & Yahr scale at ON state, and m Hoehn & Yahr scale at OFF state at baseline).
Type III p-values were calculated from multivariate logistic regression analyses controlling for interaction between the same baseline factor and istradefylline dose (20 mg/day or 40 mg/day).
UPDRS = Unified Parkinson's Disease Rating Scale;
CGI-I, Clinical Global Impressions-Improvement of illness;
n.s. = not significant;
PD = Parkinson's disease; ref = reference While the present invention has been described in detail with reference to specific embodiments, it is apparent to those skilled in the art that various changes and modifications can be made without departing from the spirit and scope of the present invention.

The invention claimed is:

1. A method for increasing an effect of shortening an OFF time in treatment of Parkinson's disease compared with the case where a therapeutic agent for Parkinson's disease containing istradefylline as an active ingredient is administered to a patient of Parkinson's disease of younger than 65 years old, comprising administering the therapeutic agent for Parkinson's disease containing istradefylline as an active ingredient to a patient of Parkinson's disease of 65 or more years old.

2. The method according to claim 1, wherein
the effect of shortening the OFF time is that the OFF time is shortened for 1 hour or longer as compared with the case where a placebo is administered, and
the increased effect is that the effect of shortening the OFF time is significantly improved in terms of odds ratio when the agent is administered to a patient of Parkinson's disease of 65 or more years old, as compared to the case where the agent is administered to a patient of Parkinson's disease of younger than 65 years old.

3. The method according to claim 1, wherein the daily dose of istradefylline is 20 mg or 40 mg.

4. The method according to claim 1, wherein the daily dose of istradefylline is 40 mg.

5. The method according to claim 1, wherein the agent is administered to a patient of Parkinson's disease during the course of treatment with an agent containing levodopa.

* * * * *